US009999113B2

(12) United States Patent
Sarangdhar et al.

(10) Patent No.: US 9,999,113 B2
(45) Date of Patent: Jun. 12, 2018

(54) INFRARED LIGHT EMITTING DIODE CONTROL CIRCUIT

(71) Applicant: Intel Corporation, Santa Clara, CA (US)

(72) Inventors: Nitin V. Sarangdhar, Portland, OR (US); Victoria C. Moore, Phoenix, AZ (US); Kumar N. Dwarakanath, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 14/971,525

(22) Filed: Dec. 16, 2015

(65) Prior Publication Data
US 2017/0181248 A1 Jun. 22, 2017

(51) Int. Cl.
H05B 37/02 (2006.01)
G06F 21/32 (2013.01)
G08B 5/36 (2006.01)
G08B 21/18 (2006.01)
H04N 5/33 (2006.01)
H05B 33/08 (2006.01)
G06F 21/82 (2013.01)

(52) U.S. Cl.
CPC ......... H05B 37/0227 (2013.01); G06F 21/32 (2013.01); G06F 21/82 (2013.01); G08B 5/36 (2013.01); G08B 21/182 (2013.01); H04N 5/33 (2013.01); H05B 33/0842 (2013.01); H05B 37/0281 (2013.01)

(58) Field of Classification Search
CPC ............. H05B 37/02; H05B 37/0227; H05B 33/0842; G08B 5/36; G08B 21/182; H04N 5/33
See application file for complete search history.

(56) References Cited

U.S. PATENT DOCUMENTS 5,986,357 A * 11/1999 Myron ............... G06K 9/00335
307/116
6,694,223 B1 2/2004 Goldberg et al.
2003/0120943 A1* 6/2003 Hughes ................... G06F 21/10
713/193
2006/0081771 A1* 4/2006 Eliad Wardimon ....... G01J 1/32
250/221

(Continued)

FOREIGN PATENT DOCUMENTS

JP 09292860 A 11/1997

OTHER PUBLICATIONS

"International Application Serial No. PCT/US2016/063357, International Search Report dated Mar. 21, 2017", 3 pgs.

(Continued)

Primary Examiner — Douglas W Owens
Assistant Examiner — James H Cho
(74) Attorney, Agent, or Firm — Schwegman Lundberg & Woessner, P.A.

(57) ABSTRACT

Disclosed in some examples are devices, methods, and machine-readable mediums for reliable control of IR LEDs. In some examples, a microcontroller running firmware controls whether the LED is activated or not by use of a disable signal. The microcontroller enables or disables the operation of the LED based upon a user's proximity to the LED, a watchdog timer, and a confirmation that only trusted software is executing.

18 Claims, 5 Drawing Sheets

(56) References Cited

U.S. PATENT DOCUMENTS

| | | | |
|---|---|---|---|
| 2007/0200725 A1 | 8/2007 | Fredericks et al. | |
| 2010/0181974 A1* | 7/2010 | Chen | G05F 1/575 323/282 |
| 2012/0119681 A1* | 5/2012 | Seidl | H05B 37/0272 315/362 |
| 2015/0248566 A1* | 9/2015 | Scott-Nash | G06F 21/6245 726/26 |
| 2016/0270190 A1* | 9/2016 | Chen | H03K 17/133 |

OTHER PUBLICATIONS

"International Application Serial No. PCT/US2016/063357, Written Opinion dated Mar. 21, 2017", 9 pgs.

Ittai, Anati, et al., "Innovative Technology for CPU Based Attestation and SE Aling", s0ftware.intel.com, [Online]. Retrieved from the Internet: <https://software.intel.com/en-us/articles/innovâtive-technology-for-cpu-based-attestation-and-sealing>, (Aug. 14, 2013), 1-7.

Rakeshron, "Proximity Sensor", In Ron Robotics, [Online]. Retrieved from the Internet: <URL:http://www.rakeshmondal.info/sensors/proximity-sensor, (Apr. 14, 2014), 1-6.

\* cited by examiner

INFRARED LIGHT EMITTING DIODE CONTROL CIRCUIT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright INTEL, Corp., All Rights Reserved.

TECHNICAL FIELD

Embodiments pertain to circuitry for controlling an Infrared (IR) Light Emitting Diode (LED).

BACKGROUND

IR LEDs emit light in the infrared spectrum. These LEDs are used in many applications including biometric authentication applications such as IR cameras.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
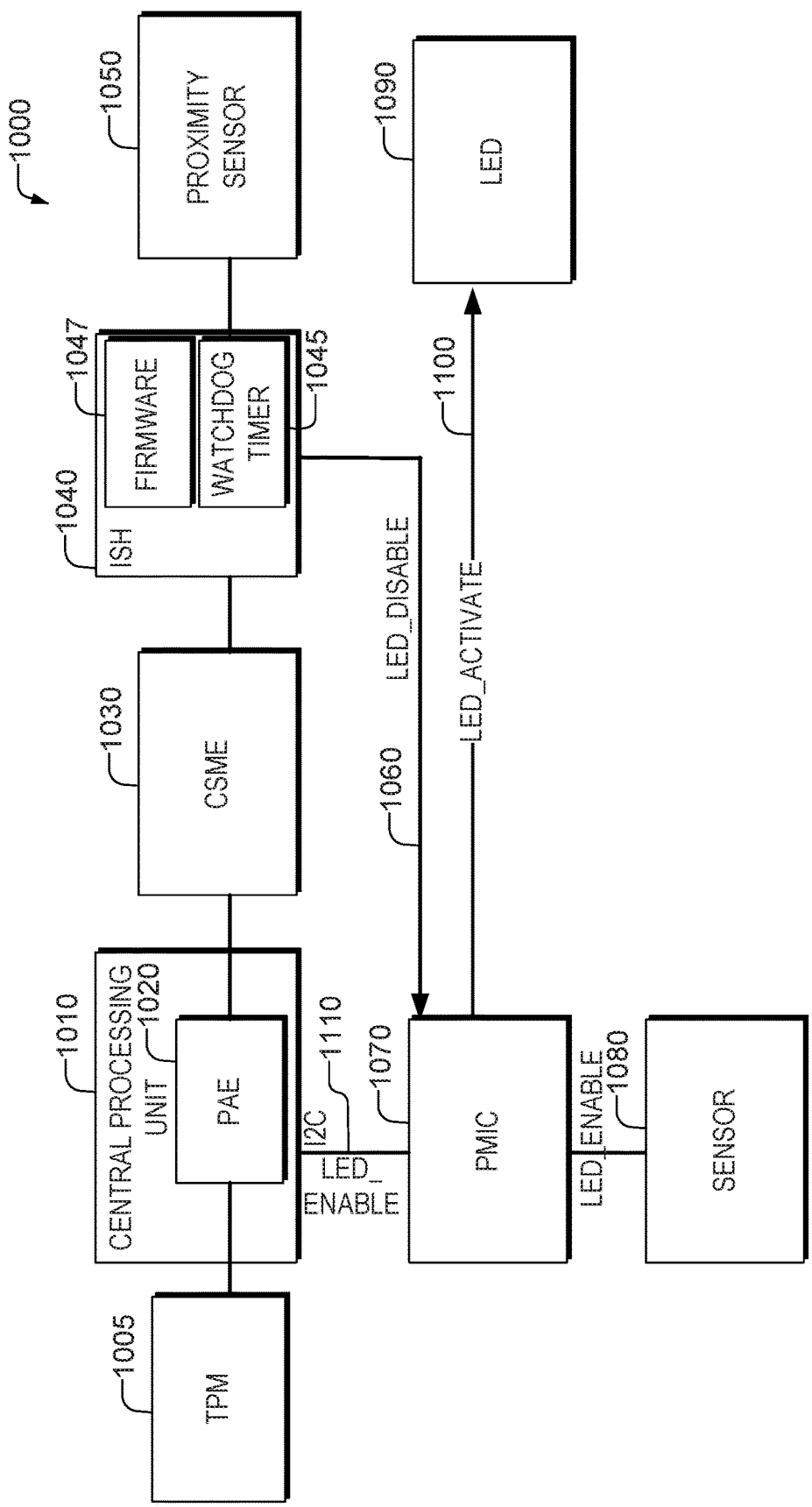
FIG. 1 is a schematic of IR LED system according to some examples of the present disclosure.

Infrared light may be harmful to human eyes depending on the distance, intensity, and amount of time an eye is exposed to the active LED. As a result, the use of IR LEDs in biometric authentication devices such as human iris or face capture using IR camera sensors may cause eye damage if the IR LED is not properly controlled.

Current solutions to the problem manage the LED control through software running on general purpose microprocessors. These general purpose microprocessors are also responsible for running other applications. Software in this execution environment is subject to latency in that other tasks may be executing and may prevent the LED control application from shutting off the IR LED immediately. Other issues include malware attacks which may prevent effective control of the IR LED by either disabling or corrupting the control software, or through starvation by keeping the processor busy doing other tasks. Furthermore, such malware may attempt to capture biometric data and send it to an unauthorized source. Such weaknesses are not desirable when human health, safety, and privacy are at risk.

Disclosed in some examples are devices, methods, and machine-readable mediums for reliable control of IR LEDs. In some examples, a microcontroller running firmware controls whether the LED is selectively activated by use of a disable signal that is sent when a deactivation condition is sensed by the firmware. A microcontroller is an integrated circuit comprising a processor core, memory, and embedded software (e.g., firmware) resident in onboard memory. Interfacing with the microcontroller is implemented using one or more physical input or output connections (e.g., pins, or busses) of the microcontroller. The output behavior in response to the inputs is defined by the firmware. Firmware is software stored in non-volatile memory of the microcontroller and controls one or more outputs of the microcontroller based upon one or more inputs. Firmware, in some examples, is stored in non-volatile memory such as Read-Only Memory (ROM), Electrically Erasable Programmable Read-Only Memory (EEPROM), or the like. While a microcontroller is used herein, one of ordinary skill in the art with the benefits of applicant's disclosure will appreciate that other types of controller circuitry may be used including an Application Specific Integrated Circuit (ASIC), or the like.

Example deactivation conditions include one or more of: a proximity sensor indicating an object is too close to the LED, a running watchdog timer, and an indication that software on a microprocessor is compromised. This microcontroller firmware solution is superior to software in at least the following situations: where malware performs a denial of service attack on the watchdog timer services; where malware performs a denial of service attack on human proximity detection services; where the platform is running a workload that does not allow software to run at a regular interval to detect inadvertent human movement; and where the platform software is fully replaced with malware or an old version of the software that does not offer biometric image capture protection without user knowledge or understanding.

Turning now to FIG. 1, a schematic of an IR LED system 1000 is shown according to some examples of the present disclosure. Central Processing Unit (CPU) 1010 may execute software, such as one or more of: an operating system, a biometric authentication application, network applications, and the like. In order to ensure the integrity of the biometric authentication software as well as the operating system and other software running on the IR LED system 1000, a Trusted Platform Module (TPM) 1005 may provide measurements that verify the integrity of this software. Measurements are made using a hash function to fingerprint the software. Measurements may be made of one or more of: the biometric software, the operating system, and other software on executing on the CPU 1010.

The current TPM measurements may be compared periodically to gold measurements which are predetermined known good measurements. If the current measurements do not match the gold measurements, then the attestation fails. If the current measurements match the gold measurements the attestation succeeds. In some examples the comparison may be made upon system startup, or upon waking up from hibernation (S4 state) or a sleep state. The gold measurements may be obtained from one or more remote attestation servers (not shown for clarity). These servers may be available over a network (e.g., the Internet) and may provide known good measurements to the IR LED system 1000. In order to ensure that the code for performing the comparison, and the gold measurements received from the attestation server are adequately protected from being compromised, a trusted execution environment may be utilized to receive these measurements from the attestation server and to perform the comparison.

A trusted execution environment such as a Software Guard Extensions® (SGX) enclave creates a private region of code and data created by special CPU instructions. These environments provide a protected environment for sensitive data that protects it from unauthorized access or modifications by rogue software running at enhanced privilege levels. An SGX enclave is a "sandbox,"—an area of code and memory protected from access by other applications (including those that have higher privileges.) While SGX is described herein, in other examples, other trusted execution environments may be utilized, including TrustZone® technology for ARM® based processor architectures, and the like.

In some examples, an SGX enclave may be created called the Platform Attestation Enclave (PAE) 1020 which obtains gold measurements for the current platform (e.g., the operating system, the biometric software, and other software executing on the CPU 1010) from an attestation server and compares them with current TPM measurements of the platform to generate a platform attestation status. This comparison may be utilized to generate a platform attestation status which attests that the software is either performing normally or is compromised. While SGX is referred to herein, other methods of providing a protected environment from malware may be utilized. The use of the SGX enclave in performing the TPM comparisons ensures that rogue software does not circumvent the integrity checks.

Converged Security Management Engine 1030 is a microcontroller which serves as a proxy to securely communicate the platform attestation status to the Integrated Sensor Hub (ISH) 1040. In some examples, ISH 1040 may securely communicate directly with CPU 1010. In some examples, CSME 1030 and ISH 1040 functionality may coexist inside the same microcontroller.

Integrated Sensor Hub (ISH) 1040 may be an integrated circuit microcontroller executing firmware module 1047 and may have a watchdog timer 1045. Watchdog timer 1045 may be a hardware timer, or may be part of the firmware module 1047. ISH 1040 generates a LED_DISABLE signal 1060 to Power Management Integrated Circuit (PMIC) 1070 when firmware module 1047 detects the presence of a deactivation condition from a set of possible deactivation conditions. LED_DISABLE signal 1060 prevents the PMIC 1070 from sending an LED_ACTIVATE 1100 signal to the LED 1090 to turn on the LED 1090. In some examples, firmware module 1047 issues LED_DISABLE signal 1060 when any one or more of the following possible deactivation conditions are met: the proximity sensor 1050 senses that the user gets closer than a predetermined distance (e.g., 20 centimeters) to the LED 1090 (or some other established point), watchdog timer 1045 is running, or the platform attestation status issued by the PAE 1020 indicates the software is compromised. Other deactivation conditions may also be used, such as a temperature of the LED (to prevent overheating), a temperature of other components in the system, if the authentication of the user of the software in CPU 1010 fails (to prevent unauthorized use of the system), and the like. If a deactivation condition is not present, ISH 1040 stops or clears generation of LED_DISABLE signal 1060. Firmware module 1047 continuously monitors the above conditions.

Power Management Integrated Circuit (PMIC) 1070 is a power management IC that provides power to LED 1090 to activate it in the form of the LED_ACTIVATE signal 1100. PMIC 1070 receives two inputs—an LED_ENABLE input and an LED_DISABLE input. The LED_ENABLE signal may be sent by the software running in the Central Processing Unit 1010 directly through inter-integrated circuit (I2C) interface 1110. In other examples, CPU 1010 may send a LED_ENABLE to sensor 1080 (e.g., through the same or a different I2C interface than I2C interface 1110), who may then provide LED ENABLE signal to the PMIC 1070. The latter is useful when the LED_ENABLE signal requires synchronization with a clock on sensor 1080. In some examples, PMIC 1070 uses the logic LED_ACTIVATE=LED_ENABLE AND NOT LED_DISABLE as a logic to generate the LED_ACTIVATE signal 1100 to activate the IR LED 1090. Thus, PMIC 1070 will activate the LED when the LED_ENABLE signal is active and the LED_DISABLE signal is not active. The software component running in Central Processing Unit 1010 may then turn off LED 1090 when it successfully completes the operation (e.g., biometric template match), or a software defined timeout period has expired. Once LED 1090 is turned off the watchdog timer 1045 starts and prevents the activation of the LED 1090 until it has expired to ensure a minimum amount of time that it remains off (e.g. 10 seconds). PMIC 1070 may also enable sensor 1080 when the LED_ACTIVATE 1100 signal is sent to the LED.

Sensor 1080 may be any sensor, that includes for example, a camera lens and camera controller that captures an image of a person's biometrics (e.g. face or IRIS) for capture and recognition. Proximity sensor 1050 may provide input to the ISH 1040 on whether a person is too close to the IR LED 1090. In some examples, the functions of the PMIC 1070 and the ISH 1040 may be performed by the same integrated circuit, rather than being discrete components. In these examples the LED_ENABLE signal is sent to this combined IC. The combined IC generates a LED_ACTIVATE 1100 signal if all of the following conditions are met: LED_ENABLE signal is present, the proximity sensor 1050 senses that the user is not closer than the predetermined range (e.g., 20 centimeters) to the LED 1090 (or some other established point), the watchdog timer 1045 is not running, and the PAE 1020 indicates no problems with the software on the CPU 1010.

Components of the IR LED system 1000, including the TPM 1005, CPU 1010, CSME 1030, ISH 1040, proximity sensor 1050, PMIC 1070, sensor 1080, and LED 1090 may be communicatively coupled to one another through one or more buses, including an I2C bus, or through direct connections. In some examples, components of FIG. 1 that are not shown as connected to each other may be connected to each other. LED 1090 may emit infrared light, visible light, ultraviolet light, or any combination.

Figure 2:
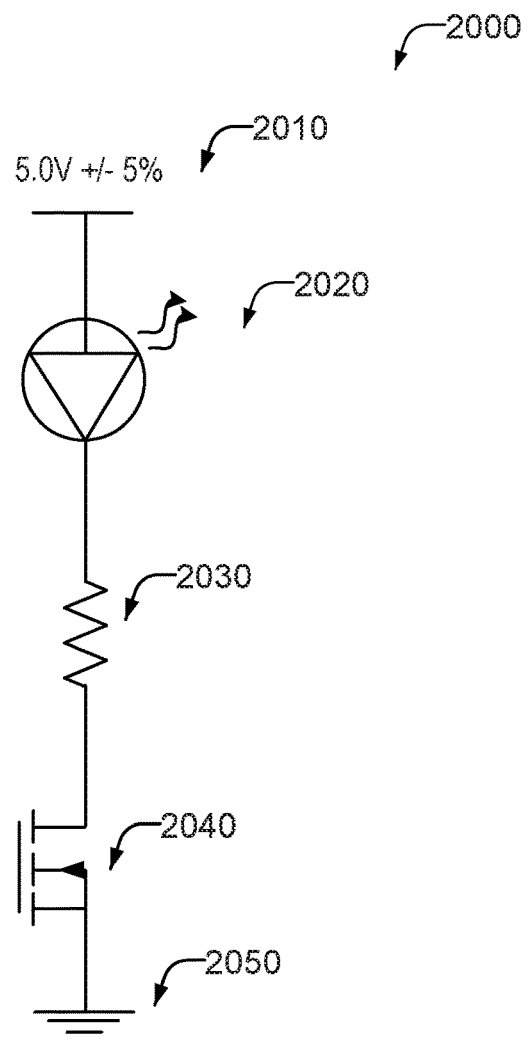
FIG. 2 shows an example schematic of a discrete voltage regulator output with a series resister according to some examples of the present disclosure.

In other examples, the functions of the PMIC 1070 may be implemented through a discrete voltage regulator output with a series resistor as shown in FIG. 2. FIG. 2 shows an example schematic 2000 of a discrete voltage regulator output with a series resister according to some examples of the present disclosure. Component 2010 is a power source, in some examples a 5.0 volt power source (+/−5%). Component 2020 is an IR LED, for example, IR LED 1090 from FIG. 1. An example IR LED would be the SFH4780S from OSRAM® Opto Semiconductors. In some examples, the ILEDMIN=290 mA, ILEDTYP=390 mA, and ILEDMAX=490 mA. Component 2030 is a resistor. In some examples, it is a 4.32 Ω/1%/1.5 W resistor. Component 2040 is a Field Effect Transistor (FET). In some examples, the FET may be an INTERNATIONAL RECTIFIER® IRLML0030 FET. Component 2050 is a ground. The LED_ACTIVATE LED_DEACTIVATE signals are inputs to the FET.

Figure 3:
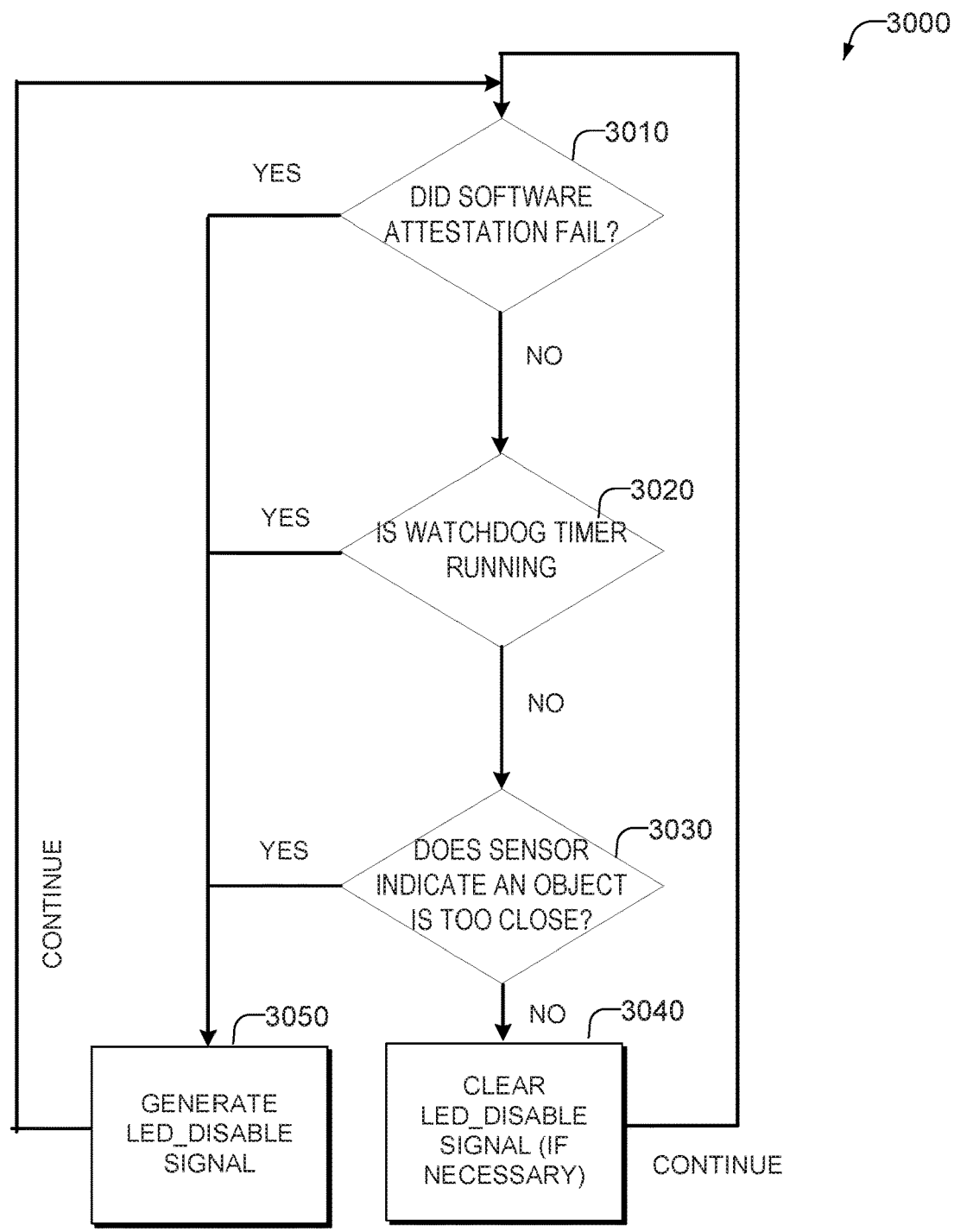
FIG. 3 shows a flowchart of a method of controlling an IR LED according to some examples of the present disclosure.

Turning now to FIG. 3, a flowchart 3000 of a method of controlling an IR LED is shown according to some examples of the present disclosure. In some examples, FIG. 3 is performed by a component of the IR LED system, such as an ISH (e.g., ISH 1040). The system determines the software attestation status at operation 3020. In some examples, the software attestation status may be determined at system boot time, or if the system is resuming from a sleep or hibernating state (e.g., an S4 state). This may be done by comparing, in an SGX enclave, gold TPM measurements obtained from an attestation server to current TPM measurements of the platform obtained from a TPM. If the software attestation status fails, at operation 3050 the component (e.g., ISH) generates the LED_DISABLE signal.

If the software attestation status is acceptable, the component (e.g., ISH) determines the state of the watchdog timer at operation 3020. If the watchdog timer is running then the component generates the LED_DISABLE signal at operation 3050.

If the watchdog timer is not running, then the system determines whether the proximity sensor indicates that a user is too close to the IR LED at operation 3030. If there is a user too close to the IR LED, then the system generates the LED DISABLE signal 3050. If there is not a user too close to the IR LED, then the system clears the LED_DISABLE signal if necessary at operation 3040, allowing the IR LED to be enabled. One of ordinary skill in the art with the benefit of applicants' disclosure will appreciate that the checks in operations 3010, 3020, and 3030 may be performed in any order.

Figure 4:
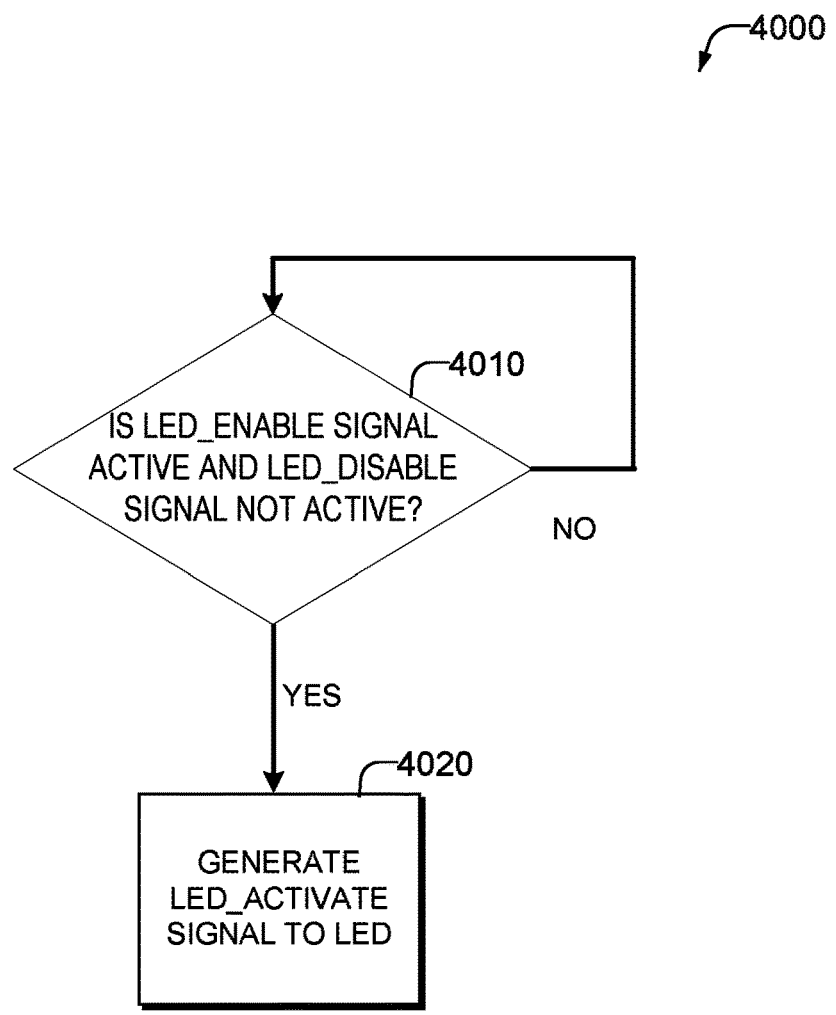
FIG. 4 shows a flowchart of a method of controlling an IR LED according to some examples of the present disclosure.

Turning now to FIG. 4, a flowchart 4000 of a method of controlling an IR LED is shown according to some examples of the present disclosure. In some examples, FIG. 4 is performed by a component of the IR LED system 1000, such as the PMIC (such as PMIC 1070 of FIG. 1). At operation 4010 the component (e.g., the PMIC) determines the status of both the LED_ENABLE signal and the LED_DISABLE signal. Only if the LED_ENABLE signal is active and the LED_DISABLE signal is not active does processing flow to operation 4020 where the component (e.g., the PMIC) generates the LED_ACTIVATE signal to the LED 4020.

In some examples, the ISH and the PMIC are integrated and the operations of FIGS. 3 and 4 are merged into one Integrated Circuit. In these examples, the integrated ISH would generate an LED_ACTIVATE signal to the LED if LED_ENABLE is true AND the watchdog timer is not running AND the software attestation did not fail AND the proximity sensor indicates that the user is not too close to the IR LED.

Figure 5:
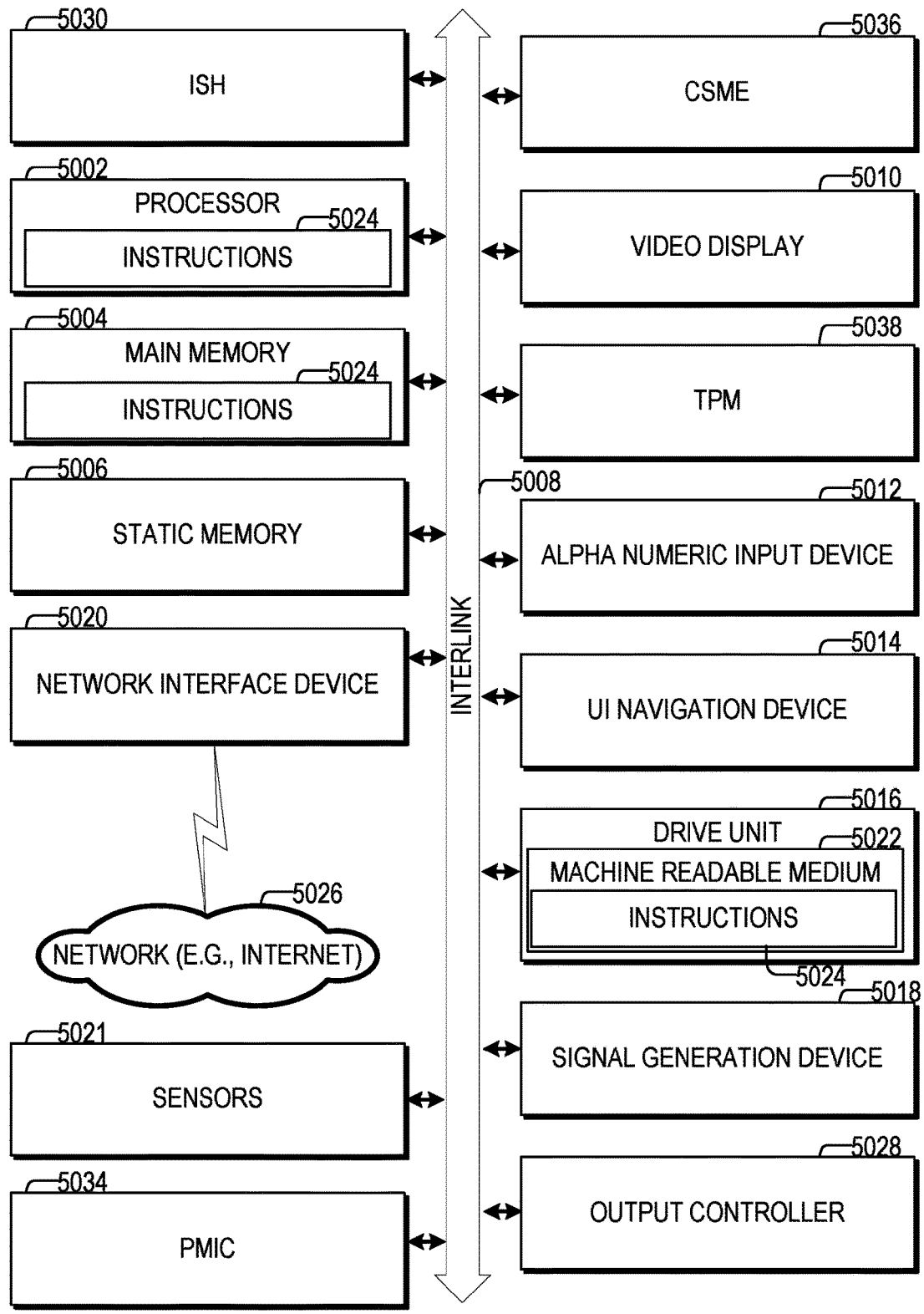
FIG. 5 is a block diagram illustrating an example of a machine upon which one or more embodiments may be implemented.

FIG. 5 illustrates a block diagram of an example machine 5000 upon which any one or more of the techniques (e.g., methodologies) discussed herein may be integrated with. In some examples, machine 5000 may include the components of FIG. 1 in addition to or instead of one or more of the components discussed with respect to FIG. 5. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a personal computer (PC), a tablet PC, a set-top box (STB), a personal digital assistant (PDA), a mobile telephone, a smart phone, a web appliance, a network router, switch or bridge, a specially built biometric reader, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), which may be the same processor as central processing unit 1010 of FIG. 1. Processor 5002 may also include the ability to create a trusted execution environment, such as for example, a PAE. Machine also contains a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., an IR LED, such as LED 1090, a speaker, and the like), a network interface device 5020, and one or more sensors 5021, such as a global positioning system (GPS) sensor, compass, accelerometer, proximity sensor (e.g., proximity sensor 1050 from FIG. 1), or other sensor (such as a biometric sensor such as sensor 1080). The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques. Machine 5000 may also include an ISH 5030 (such as ISH 1040 from FIG. 1), a TPM module 5038 (such as TPM 1005 from FIG. 1), a CSME 5036 (such as CSME 1030 from FIG. 1), and a PMIC 5034 (such as PMIC 1070 from FIG. 1).

OTHER NOTES AND EXAMPLES

Example 1 is a microcontroller for controlling a light emitting diode (LED), the microcontroller comprising: a firmware to configure the microcontroller to perform operations of: determining that a deactivation condition from a set of deactivation conditions is present, the set of deactivation conditions comprising: a timer deactivation condition, a software attestation deactivation condition, or a proximity deactivation condition; and responsive to determining that the deactivation condition has been met, preventing activation of the LED.

In Example 2, the subject matter of Example 1 optionally includes, wherein the software attestation deactivation condition comprises an attestation failure of software executing on a central processing unit communicatively coupled to the microcontroller.

In Example 3, the subject matter of any one or more of Examples 1-2 optionally include, wherein the proximity deactivation condition comprises an indication from a proximity sensor of a presence of an object within a predetermined distance from the LED.

In Example 4, the subject matter of any one or more of Examples 1-3 optionally include, wherein the timer deactivation condition comprises a running watchdog timer, the firmware configured to start the watchdog timer when the LED is turned off.

In Example 5, the subject matter of Example 4 optionally includes, wherein the watchdog timer is implemented by the firmware.

In Example 6, the subject matter of any one or more of Examples 1-5 optionally include, wherein the firmware is configured to continuously monitor the deactivation condition and in response to detecting that none of the set of deactivation condition is present, allowing activation of the LED.

In Example 7, the subject matter of any one or more of Examples 1-6 optionally include, wherein the firmware is configured to prevent activation of the LED by sending a disable signal to a power management integrated circuit (PMIC), the PMIC refraining from sending an activation signal to activate the LED responsive to receiving the disable signal from the microcontroller.

In Example 8, the subject matter of any one or more of Examples 1-7 optionally include, wherein the firmware is configured to prevent activation of the LED by refraining from sending an activation signal to the LED in response to receiving an enabling signal from a central processing unit coupled to the microcontroller.

Example 9 is a non-transitory machine readable medium that stores instructions which when performed by a machine, cause the machine to perform operations comprising: determining that a deactivation condition from a set of deactivation conditions is present, the set of deactivation conditions comprising: a timer deactivation condition, a software attestation deactivation condition, or a proximity deactivation condition; and responsive to determining that the deactivation condition has been met, preventing activation of an LED.

In Example 10, the subject matter of Example 9 optionally includes, wherein the software attestation deactivation condition comprises an attestation failure of software executing on a central processing unit communicatively coupled to the machine.

In Example 11, the subject matter of any one or more of Examples 9-10 optionally include, wherein the proximity deactivation condition comprises an indication from a proximity sensor of a presence of an object within a predetermined distance from the LED.

In Example 12, the subject matter of any one or more of Examples 9-11 optionally include, wherein the timer deactivation condition comprises a running watchdog timer, the watchdog timer started when the LED is turned off.

In Example 13, the subject matter of Example 12 optionally includes, wherein the watchdog timer is implemented by the machine.

In Example 14, the subject matter of any one or more of Examples 9-13 optionally include, wherein the operations comprise continuously monitoring the deactivation condition and in response to detecting that none of the set of deactivation condition is present, allowing activation of the LED.

In Example 15, the subject matter of any one or more of Examples 9-14 optionally include, wherein the operations comprise preventing activation of the LED by sending a disable signal to a power management integrated circuit (PMIC), the PMIC refraining from sending an activation signal to activate the LED responsive to receiving the disable signal.

In Example 16, the subject matter of any one or more of Examples 9-15 optionally include, wherein the operations comprise preventing activation of the LED by refraining from sending an activation signal to the LED in response to receiving an enabling signal from a central processing unit.

Example 17 is a method comprising: using a processor: determining that a deactivation condition from a set of deactivation conditions is present, the set of deactivation conditions comprising: a timer deactivation condition, a software attestation deactivation condition, or a proximity deactivation condition; and responsive to determining that the deactivation condition has been met, preventing activation of an LED.

In Example 18, the subject matter of Example 17 optionally includes, wherein the software attestation deactivation condition comprises an attestation failure of software executing on a central processing unit communicatively coupled to the processor.

In Example 19, the subject matter of any one or more of Examples 17-18 optionally include, wherein the proximity deactivation condition comprises an indication from a proximity sensor of a presence of an object within a predetermined distance from the LED.

In Example 20, the subject matter of any one or more of Examples 17-19 optionally include, wherein the timer deactivation condition comprises a running watchdog timer, the watchdog timer started when the LED is turned off.

In Example 21, the subject matter of Example 20 optionally includes, wherein the watchdog timer is implemented by the processor.

In Example 22, the subject matter of any one or more of Examples 17-21 optionally include continuously monitoring the deactivation condition and in response to detecting that none of the set of deactivation condition is present, allowing activation of the LED.

In Example 23, the subject matter of any one or more of Examples 17-22 optionally include preventing activation of the LED by sending a disable signal to a power management integrated circuit (PMIC), the PMIC refraining from sending an activation signal to activate the LED responsive to receiving the disable signal from the processor.

In Example 24, the subject matter of any one or more of Examples 17-23 optionally include preventing activation of the LED by refraining from sending an activation signal to the LED in response to receiving an enabling signal from a central processing unit coupled to the processor.

Example 25 is a device comprising: means for determining that a deactivation condition from a set of deactivation conditions is present, the set of deactivation conditions comprising: a timer deactivation condition, a software attestation deactivation condition, or a proximity deactivation condition; and means for preventing activation of an LED responsive to determining that the deactivation condition has been met.

In Example 26, the subject matter of Example 25 optionally includes, wherein the software attestation deactivation condition comprises an attestation failure of software executing on a central processing unit communicatively coupled to the device.

In Example 27, the subject matter of any one or more of Examples 25-26 optionally include, wherein the proximity deactivation condition comprises an indication from a proximity sensor of a presence of an object within a predetermined distance from the LED.

In Example 28, the subject matter of any one or more of Examples 25-27 optionally include, wherein the timer deactivation condition comprises a running watchdog timer, the watchdog timer started when the LED is turned off.

In Example 29, the subject matter of Example 28 optionally includes, wherein the watchdog timer is implemented by a processor.

In Example 30, the subject matter of any one or more of Examples 25-29 optionally include means for continuously monitoring the deactivation condition and means for allowing activation of the LED in response to detecting that none of the set of deactivation condition is present.

In Example 31, the subject matter of any one or more of Examples 25-30 optionally include, wherein the means for preventing activation of the LED comprise means for sending a disable signal to a power management integrated circuit (PMIC), the PMIC refraining from sending an activation signal to activate the LED responsive to receiving the disable signal from the device.

In Example 32, the subject matter of any one or more of Examples 25-31 optionally include, wherein the means for preventing activation of the LED comprise means for refraining from sending an activation signal to the LED in response to receiving an enabling signal from a central processing unit coupled to the device.

Example 33 is a system for controlling a light emitting diode (LED), the system comprising: a central processing unit (CPU); a power management integrated circuit (PMIC); a integrated sensor hub microcontroller (ISH); wherein the PMIC is communicatively coupled to the LED, the CPU and the ISH and is configured to: send an activation signal to the LED in response to receipt of an enable signal from a software application executing on the CPU and responsive to determining that a disable signal from the ISH is not present; and wherein the ISH is configured to: generate the disable signal to PMIC responsive to determining that a deactivation condition has been met.

In Example 34, the subject matter of Example 33 optionally includes, wherein the deactivation condition comprises one of: a running watchdog timer, a proximity signal from a proximity sensor indicating an object is within a predetermined distance from the LED, and an indication from the CPU that the integrity of the software application is compromised.

In Example 35, the subject matter of any one or more of Examples 33-34 optionally include comprising a proximity sensor configured to: generate a proximity signal to the ISH in response to a determination that an object is closer than a predetermined distance to the LED, the signal to the ISH from the proximity sensor being the deactivation condition.

In Example 36, the subject matter of any one or more of Examples 33-35 optionally include, wherein the CPU is configured to: provide a protected environment for a platform attestation enclave; and using the platform attestation enclave, provide an attestation of the integrity of the software application to the ISH, an attestation that the integrity of the software application is compromised being the deactivation condition.

In Example 37, the subject matter of any one or more of Examples 33-36 optionally include, wherein the ISH is configured to start a watchdog timer when the LED transitions from an ON state to an OFF state, a running watchdog timer being the deactivation condition.

In Example 38, the subject matter of any one or more of Examples 33-37 optionally include, wherein the PMIC comprises a discrete voltage regulator output with a series resister.

What is claimed is:

1. A system for controlling a light emitting diode (LED), the system comprising:
   a central processing unit (CPU);
   a power management integrated circuit (PMIC); and
   an integrated sensor hub microcontroller (ISH);
   wherein the PMIC is communicatively coupled to the LED, the CPU and the ISH and is configured to:
      send an activation signal to the LED in response to receipt of an enable signal from a software application executing on the CPU and responsive to determining that a disable signal from the ISH is not present; and
   wherein the ISH is configured to:
      generate the disable signal to the PMIC responsive to determining that a deactivation condition has been met; and
      start a watchdog timer when the LED transitions from an ON state to an OFF state, wherein a running watchdog timer being the deactivation condition.

2. The system of claim 1, wherein the deactivation condition additionally comprises one of: a proximity signal from a proximity sensor indicating an object is within a predetermined distance from the LED, and an indication from the CPU that the integrity of the software application is compromised.

3. The system of claim 1 comprising
   a proximity sensor configured to:
      generate a proximity signal to the ISH in response to a determination that an object is closer than a predetermined distance to the LED, the signal to the ISH from the proximity sensor being an additional deactivation condition.

4. The system of claim 1, wherein the CPU is configured to:
   provide a protected environment for a platform attestation enclave; and
   using the platform attestation enclave, provide an attestation of the integrity of the software application to the ISH, an attestation that the integrity of the software application is compromised being an additional deactivation condition.

5. The system of claim 4, wherein to provide the attestation of the integrity of the software application to the ISH comprises a comparison of a measurement of software executing on the CPU with a known good measurement.

6. The system of claim 5, wherein the protected environment is a trusted execution environment.

7. The system of claim 6, wherein the trusted execution environment is a Software Guard Extension (SGX) enclave.

8. The system of claim 1, wherein the PMIC comprises a discrete voltage regulator output with a series resister.

9. The system of claim 1, wherein the LED emits light in an infrared wavelength.

10. A method for controlling a light emitting diode (LED), the method comprising:
    using a power management integrated circuit (PMIC) that is communicatively coupled to an light emitting diode (LED), a central processing unit (CPU), and an integrated sensor hub microcontroller (ISH) to:
    send an activation signal to the LED in response to receipt of an enable signal from a software application executing on the CPU and responsive to determining that a disable signal from the ISH is not present; and
    using the ISH to:
       generate the disable signal to the PMIC responsive to determining that a deactivation condition has been met; and
       start a watchdog timer when the LED transitions from an ON state to an OFF state, wherein a running watchdog timer being the deactivation condition.

11. The method of claim 10, wherein the deactivation condition additionally comprises one of: a proximity signal from a proximity sensor indicating an object is within a predetermined distance from the LED, and an indication from the CPU that the integrity of the software application is compromised.

12. The method of claim 10 comprising
    using a proximity sensor to:
       generate a proximity signal to the ISH in response to a determination that an object is closer than a predetermined distance to the LED, the signal to the ISH from the proximity sensor being an additional deactivation condition.

13. The method of claim 10, further comprising using the CPU to:
    provide a protected environment for a platform attestation enclave; and
    using the platform attestation enclave to provide an attestation of the integrity of the software application to the ISH, an attestation that the integrity of the software application is compromised being an additional deactivation condition.

14. The method of claim 13, wherein to provide the attestation of the integrity of the software application to the ISH comprises a comparison of a measurement of software executing on the CPU with a known good measurement.

15. The method of claim 13, wherein the protected environment is a trusted execution environment.

16. The method of claim 15, wherein the trusted execution environment is a Software Guard Extension (SGX) enclave.

17. The method of claim 10, wherein the PMIC comprises a discrete voltage regulator output with a series resister.

18. The method of claim 10, wherein the LED emits light in an infrared wavelength.

\* \* \* \* \*